US012270955B2

(12) United States Patent
Fujita et al.

(10) Patent No.: US 12,270,955 B2
(45) Date of Patent: Apr. 8, 2025

(54) PLASTIC SCINTILLATING FIBER AND ITS MANUFACTURING METHOD

(71) Applicant: KURARAY CO., LTD., Okayama (JP)

(72) Inventors: Katsuhiro Fujita, Niigata (JP); Toru Hashizume, Niigata (JP)

(73) Assignee: KURARAY CO., LTD., Okayama (JP)

( * ) Notice: Subject to any disclaimer, the term of this patent is extended or adjusted under 35 U.S.C. 154(b) by 0 days.

(21) Appl. No.: 18/032,065

(22) PCT Filed: Jul. 1, 2021

(86) PCT No.: PCT/JP2021/025035
§ 371 (c)(1),
(2) Date: Apr. 14, 2023

(87) PCT Pub. No.: WO2022/079957
PCT Pub. Date: Apr. 21, 2022

(65) Prior Publication Data
US 2023/0391030 A1    Dec. 7, 2023

(30) Foreign Application Priority Data
Oct. 15, 2020    (JP) .................................. 2020-173826

(51) Int. Cl.
*G02B 6/036* (2006.01)
*B29D 11/00* (2006.01)
(Continued)

(52) U.S. Cl.
CPC ........ *G01T 1/201* (2013.01); *B29D 11/00701* (2013.01); *C09K 11/66* (2013.01);
(Continued)

(58) Field of Classification Search
CPC ...... G02B 6/02; G02B 6/02033; G02B 6/036; G02B 6/03616; G01T 1/201; G01T 3/06; B29D 11/00682; B29D 11/00701
See application file for complete search history.

(56) References Cited

U.S. PATENT DOCUMENTS 3,041,287 A    6/1962  Hyman, Jr.
5,308,986 A    5/1994  Walker
(Continued)

FOREIGN PATENT DOCUMENTS

CN    102183812 A  *  9/2011  ............... G02B 6/02
JP    H6-201835 A       7/1994
(Continued)

OTHER PUBLICATIONS

ISR for PCT/JP2021/025035, dated Sep. 21, 2021 (w/ translation).
(Continued)

*Primary Examiner* — Daniel Petkovsek
(74) *Attorney, Agent, or Firm* — Greenblum & Bernstein, P.L.C.

(57) ABSTRACT

A plastic scintillating fiber includes: an outermost peripheral layer containing a compound of a heavy metal element and containing a resin having scintillating properties; a core disposed inside the outermost peripheral layer and containing at least one type of fluorescent substance that absorbs the scintillation light generated from the outermost peripheral layer and wavelength-converts the absorbed light into light having a wavelength longer than that of the absorbed light; and a cladding layer covering an outer peripheral surface of the core and having a refractive index lower than that of the core. A wavelength shifting fiber including the core and the cladding layer, and the outermost peripheral layer covering an outer peripheral surface of the wavelength shifting fiber are integrally formed.

11 Claims, 6 Drawing Sheets

(51) Int. Cl.
*C09K 11/66* (2006.01)
*C09K 11/74* (2006.01)
*G01T 1/20* (2006.01)
*G02B 1/04* (2006.01)

(52) U.S. Cl.
CPC .............. *C09K 11/74* (2013.01); *G02B 1/046* (2013.01); *G02B 6/03622* (2013.01)

(56) References Cited

U.S. PATENT DOCUMENTS

| | | | |
|---|---|---|---|
| 5,434,415 | A | 7/1995 | Terada et al. |
| 9,482,763 | B2 * | 11/2016 | Vasilyev ................. G01V 5/125 |
| 2004/0178350 | A1 * | 9/2004 | Nagano ............. H01L 27/14663 |
| | | | 250/370.11 |
| 2012/0280132 | A1 | 11/2012 | Nakamura et al. |
| 2013/0208857 | A1 | 8/2013 | Arodzero et al. |
| 2015/0097122 | A1 | 4/2015 | Nakamura et al. |
| 2016/0259070 | A1 | 9/2016 | Fukuda et al. |
| 2017/0352445 | A1 | 12/2017 | Darbon et al. |
| 2023/0384466 | A1 * | 11/2023 | Fujita ..................... G02B 6/102 |
| 2023/0391030 | A1 | 12/2023 | Fujita et al. |

FOREIGN PATENT DOCUMENTS

| | | |
|---|---|---|
| JP | H6-317713 A | 11/1994 |
| JP | H9-236669 A | 9/1997 |
| JP | 2004-281439 | 10/2004 |
| JP | 2011-141239 A | 7/2011 |
| JP | 2015-72227 A | 4/2015 |
| JP | 2015-513075 A | 4/2015 |
| JP | 2019-148538 | 9/2019 |
| WO | WO-9735171 A1 * | 9/1997 .............. G01J 1/48 |
| WO | WO 2015/064588 A1 | 5/2015 |

OTHER PUBLICATIONS

Hajagos et al., "High-Z Sensitized Plastic Scintillators: A Review", Advanced Materials, vol. 30, Issue 27, 1706956, Jul. 2018, pp. 1-13.
Hamel et al., "Plastic scintillators modifications for a selective radiation detection", 4th International Conference on Advancements in Nuclear Instrumentation Measurement Methods and their Applications (ANIMMA), May 5, 2016, pp. 1-6.
Koshimizu et al., "X-ray detection capability of bismuth-loaded plastic scintillators", Japanese Journal of Applied Physics, 54, 102202, 2015, pp. 1-4.
International Preliminary Report on Patentability issued for PCT/JP2021/025035, dated Apr. 13, 2023.
International Search Report issued in International Bureau of WIPO Patent Application No. PCT/JP2021/025032, dated Sep. 21, 2021.
Supplementary European Search Report issued in counterpart European Patent Application No. EP 21879700.9, dated Sep. 30, 2024.
Supplementary European Search Report issued in counterpart European Patent Application No. EP 21879699.3 of co-pending U.S. Appl. No. 18/032,090, dated Oct. 4, 2024.

* cited by examiner

PLASTIC SCINTILLATING FIBER AND ITS MANUFACTURING METHOD

TECHNICAL FIELD

The present invention relates to a plastic scintillating fiber and its manufacturing method.

BACKGROUND ART

A conventional plastic scintillating fiber (PSF) is a plastic fiber in which the outer peripheral surface of a core, which serves as a scintillator, is covered with a cladding layer having a refractive index lower than that of the core, and is mainly used for the detection of radiation. The core is typically made of, for example, a polymeric material in which an organic fluorescent substance is added to a base material having an aromatic ring such as polystyrene or polyvinyl toluene. The cladding layer is made of a polymeric material having a low refractive index such as polymethyl methacrylate or fluorine-containing polymethyl methacrylate.

The principle based on which radiation is detected by using a plastic scintillating fiber will be explained. The base material of the core of the scintillating fiber has an aromatic ring. When applied radiation travels across the scintillating fiber, part of its energy is absorbed by the re-emission of secondary particles and the like inside the core and emitted as ultraviolet light. When no fluorescent substance is added to the core base material, the ultraviolet light is self-absorbed by the core base material itself, so that the ultraviolet light disappears without being transmitted inside the core.

In the plastic scintillating fiber, the ultraviolet light is absorbed by the fluorescent substance added to the core base material, and light having a wavelength longer than that of the absorbed light is re-emitted. Therefore, by selecting an appropriate fluorescent substance, the ultraviolet light is converted into light having a longer wavelength such as blue light, which is less likely to be self-absorbed by the core base material, and the light having the longer wavelength is transmitted inside the fiber. The light that has been transmitted inside the fiber is detected by a detector connected to one of or both ends of the fiber.

As described above, the scintillating fiber has two functions which are emitting light associated with the detection of radiation and transmitting the light. Therefore, the scintillating fiber is used for calculating a place at which a radiation passes and an amount of the radiation, for example. In such a scintillating fiber, it is important that how ultraviolet light emitted from a core should be efficiently wavelength-converted into light having a wavelength longer than that of the emitted ultraviolet light in order to transmit the light over a long distance.

Meanwhile, besides the scintillating fibers, plastic wavelength shifting fibers (WLSF) are also widely used. Wavelength shifting fibers are used, for example, in combination with plastic scintillators that emit blue light. A groove or hole is formed in a plate-like or rod-like plastic scintillator, and a wavelength shifting fiber, which absorbs blue light and converts the absorbed light into green light, is embedded in the groove or hole of the plastic scintillator.

In the case of a large detector having a large area, in some cases, it is difficult to transmit light from each of scintillators to an external photoelectric detector (e.g., a photomultiplier tube) located distant from the scintillator due to the attenuation of the light and/or the spatial constraint. In such a case, a wavelength shifting fiber that is thin, is easily bent, and is capable of transmitting light over a long distance is suitably used. It is possible to freely lay out a large number of wavelength shifting fibers up to the external photoelectric detector.

The core of the wavelength shifting fiber is made of a polystyrene resin or a polymethyl methacrylate resin, in which a fluorescent substance for shifting a wavelength (hereinafter also referred to as "wavelength-shifting fluorescent substance") is dissolved. In the wavelength shifting fiber, scintillation light that enters therein from an external scintillator is absorbed by the fluorescent substance contained in the core, and is efficiently wavelength-converted. Further, the wavelength-converted light is transmitted inside the fiber. The scintillator which is combined with the wavelength shifting fiber is not limited to the plastic scintillators, and inorganic scintillators or the like having a high detection sensitivity to X-rays and γ-rays can also be used.

As described above, by using the wavelength shifting fiber, scintillation light emitted from large-area or long scintillators can be easily concentrated. Further, the light, whose wavelength has been shifted by the core, can be transmitted by the wavelength shifting fiber, and such wavelength shifting fibers can be freely connected to one another up to the photoelectric detector.

Note that, for the detection of X-rays or γ-rays, since the detection sensitivity of plastic scintillators made solely of light elements is low due to low probability of interaction with X-rays and γ-rays, it is difficult to detect such rays by using such plastic scintillators. Therefore, for example, inorganic scintillators are used. Examples of the inorganic scintillators include, among others, $BaF_2$, CsI, $CaF_2$, $CeF_3$, $Bi_4Ge_3O_{12}$, $Y_2SiO_5$, $Y_3Al_{15}O_{12}$, $Bi_4Ge_3O_{12}$, $PbWO_4$, $CdWO_4$, $Gd_2SiO_5$: $Ce^{3+}$, $Lu_2SiO_5$: $Ce^{3+}$.

However, the attenuation lengths of inorganic scintillators are in the order of several millimeters and hence they are not highly transparent. That is, they cannot transmit emitted light (i.e., scintillation light) over a long distance. Further, due to the constraint in regard to the crystal size, it is difficult to transmit light to the photoelectric detector by using inorganic scintillators.

Further, as disclosed in Non-Patent Literature 1 and the like, there is a case where the detection sensitivity for X-rays and γ-rays is improved by adding a lead compound to a plastic scintillator. However, as the concentration of the heavy metal element added increases, the transparency of the plastic scintillator decreases. Therefore it is not suitable for use in a large size.

Therefore, for example, in Patent Literatures 1-3, a wavelength shifting fiber is placed along the end face or the surface of the scintillator, and light is transmitted to the photoelectric detector through the wavelength shifting fiber. By using the wavelength shifting fiber, the detection light can be transmitted over a longer distance.

Note that, in all of the Patent Literatures 1-3, in particular, in the detection in which the spatial resolution is considered important, such as the image detection disclosed in Patent Literature 2, a large number of post-processing steps are required in order to combine scintillators with wavelength shifting fibers.

CITATION LIST

Patent Literature

Patent Literature 1: International Patent Publication No. WO2015/064588

Patent Literature 2: Japanese Unexamined Patent Application Publication No. 2011-141239

Patent Literature 3: Japanese Unexamined Patent Application Publication No. 2015-72227

Non Patent Literature

Non Patent Literature 1: Japanese Journal of Applied Physics 54, 102202 (2015)

SUMMARY OF INVENTION

Technical Problem

In a conventional plastic scintillating fiber, the core needs to be highly transparent so that the core itself emits scintillation light and transmits the emitted scintillation light to the photoelectric detector. Therefore, it is impossible to obtain a plastic scintillating fiber having high detection sensitivity to X-rays and γ-rays by containing a compound containing a heavy metal element in the core in order to increase the interaction probability of X-rays and γ-rays.

Meanwhile, in the case of a conventional scintillation detector using wavelength shifting fibers, the post-processing for combining scintillators with wavelength shifting fibers is required. Further, in the case of performing image detection, scintillators needs to be separated and combined one by one for each of a large number of wavelength shifting fibers, thus making the processing thereof significantly difficult.

The present invention has been made in view of the above-described circumstances, and an object thereof is to provide a plastic scintillating fiber by which X-rays and γ-rays can be detected with high sensitivity, and of which the productivity is excellent.

Solution to Problem

A plastic scintillating fiber according to an aspect of the present invention includes:
  an outermost peripheral layer containing a compound of a heavy metal element and containing a resin having scintillating properties;
  a core disposed inside the outermost peripheral layer and containing at least one type of fluorescent substance that absorbs the scintillation light generated from the outermost peripheral layer and wavelength-converts the absorbed light into light having a wavelength longer than that of the absorbed light; and
  a cladding layer covering an outer peripheral surface of the core and having a refractive index lower than that of the core, in which
  a wavelength shifting fiber including the core and the cladding layer, and the outermost peripheral layer covering an outer peripheral surface of the wavelength shifting fiber are integrally formed.

When a plastic scintillating fiber is irradiated with X-rays or γ-rays, charged particles such as electrons or positrons are generated by interactions such as photoelectric effect, Compton effect, and electron pair generation, and scintillation light is emitted.

In the plastic scintillating fiber according to the present invention, since the outermost peripheral layer contains a compound of a heavy metal element, the probability of the interaction is improved, and the detection sensitivity to X-rays and γ-rays is improved as compared with conventional plastic scintillating fibers. Note that, unlike the core, the outermost peripheral layer does not require high transparency required for transmitting light, and therefore the compound of a heavy metal element can be added at a high concentration.

Further, the wavelength shifting fiber including the core and the cladding layer, and the outermost peripheral layer covering the outer peripheral surface of the wavelength shifting fiber are integrally formed, thus making the post-processing, which is required to combine a scintillator and a wavelength shifting fiber in the conventional technology, unnecessary.

That is, it is possible to provide a plastic scintillating fiber by which X-rays and γ-rays can be detected with high sensitivity, and of which the productivity is excellent.

The outermost peripheral layer may contain at least one type of fluorescent substance that absorbs the scintillation light and wavelength-converts the absorbed light into light having a wavelength longer than that of the absorbed light. This suppresses self-absorption of scintillation light by the resin having scintillating properties, further improving the detection sensitivity to X-rays and γ-rays.

The heavy metal element may be lead or bismuth.

Further, in the outermost peripheral layer, the compound of a heavy metal element may be copolymerized with the resin having scintillating properties.

The wavelength-shifting fiber and the outermost peripheral layer may be integrally formed through a drawing process. Thereby, the productivity is further improved.

Outside the outermost peripheral layer, a protective layer that protects the outermost peripheral layer may be integrally formed. This improves durability and the like.

Further, the cladding layer may have a multi-cladding structure including an inner cladding layer, and an outer cladding layer covering an outer peripheral surface of the inner cladding layer and having a refractive index lower than that of the inner cladding layer. This makes the total reflection angle wider, so that more intense light is obtained.

A reflective layer may be provided outside the outermost peripheral layer or the protective layer. The scintillation light emitted in the outermost peripheral layer and the light whose wavelength has been shifted in the core are reflected in the reflective layer to be unlikely to leak outside from the side surface of the fiber, resulting in intense light.

The reflective film may be a metal film. By the above-described configuration, a high reflectance can be obtained with a small thickness. Meanwhile, a metal film has a high interaction probability with X-rays and γ-rays. Therefore, by increasing the thickness thereof, the sensitivity to X-rays and γ-rays is improved, and the utilization efficiencies of light that is wavelength-converted in the core and scintillation light that is emitted in the outermost peripheral layer are increased, allowing to generate intense light.

A method for manufacturing a plastic scintillating fiber according to an aspect of the present invention is a method for manufacturing a plastic scintillating fiber,
  the plastic scintillating fiber including:
  an outermost peripheral layer containing a compound of a heavy metal element and containing a resin having scintillating properties;
  a core disposed inside the outermost peripheral layer and containing at least one type of fluorescent substance that absorbs the scintillation light generated from the outermost peripheral layer and wavelength-converts the absorbed light into light having a wavelength longer than that of the absorbed light; and a cladding layer covering an outer peripheral surface of the core and having a refractive index lower than that of the core, and the method including:

a process of manufacturing a preform by inserting a second cylindrical body for the cladding layer into a first cylindrical body for the outermost peripheral layer, and inserting a rod for the core into the second cylindrical body; and a process of drawing the preform while heating the preform.

A method for manufacturing a plastic scintillating fiber according to an aspect of the present invention is a method for manufacturing a plastic scintillating fiber, the plastic scintillating fiber including:

an outermost peripheral layer containing a compound of a heavy metal element and containing a resin having scintillating properties;

a core disposed inside the outermost peripheral layer and containing at least one type of fluorescent substance that absorbs the scintillation light generated from the outermost peripheral layer and wavelength-converts the absorbed light into light having a wavelength longer than that of the absorbed light; and a cladding layer covering an outer peripheral surface of the core and having a refractive index lower than that of the core, and the method including:

coating the outermost peripheral layer on a surface of a wavelength shifting fiber containing the core and the cladding layer.

Advantageous Effects of Invention

According to the present invention, it is possible to provide a plastic scintillating fiber by which X-rays and γ-rays can be detected with high sensitivity, and of which the productivity is excellent.

DESCRIPTION OF EMBODIMENTS

Specific embodiments according to the present invention will be described hereinafter with reference to the drawings. However, the present invention is not limited to the below-shown embodiments. Further, for clarifying the explanation, the following description and drawings are simplified as appropriate.

First Embodiment

<Structure of Plastic Scintillating Fiber>

Figure 1:
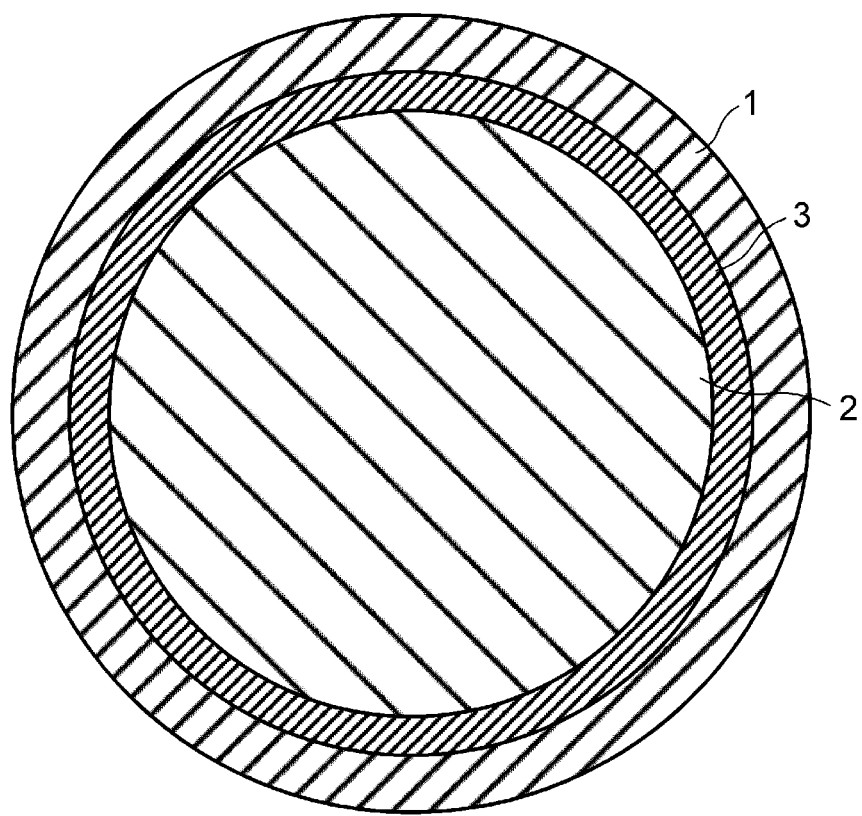
FIG. 1 is a cross-sectional diagram of a plastic scintillating fiber according to a first embodiment.

A plastic scintillating fiber according to a first embodiment of the present invention will be described with reference to FIG. 1. FIG. 1 is a cross-sectional diagram of the plastic scintillating fiber according to the first embodiment.

As shown in FIG. 1, the plastic scintillating fiber according to the first embodiment includes an outermost peripheral layer 1, a core 2, and a cladding layer 3.

The outermost peripheral layer 1 contains a compound of a heavy metal element and is made of a resin having scintillating properties. For example, the resin is a transparent resin containing, in addition to the compound of a heavy metal element, fluorescent substance that absorbs the scintillation light generated from the resin and converts the absorbed light into light having a wavelength longer than that of the absorbed light. Note that, the heavy metal element is a metal element having a specific gravity of 4 or more in the case of a simple substance.

The outermost peripheral layer 1 contains wavelength shifting fluorescent substance, suppressing self-absorption of scintillation light by the transparent resin, and further improving the detection sensitivity to X-rays and γ-rays.

The outermost peripheral layer 1 preferably sufficiently emits light and is sufficiently transparent to allow the scintillation light to pass through the cladding layer 3 and enter the core 2 located at the center of the fiber. Further, the outermost peripheral layer 1 does not necessarily need to be highly transparent, but is preferably as transparent as possible. The thickness of the outermost peripheral layer 1 may be increased to obtain the required detection sensitivity to X-rays and γ-rays. Even if the transparency of the outermost peripheral layer 1, which is the scintillator layer, is low, it is possible to transmit light over a long distance as long as the core 2 which transmits the light at the center of the fiber is highly transparent.

The core 2 is disposed inside the outermost peripheral layer 1, and is made of a transparent resin having a high refractive index and containing at least one type of fluorescent substance that absorbs scintillation light generated in the outermost peripheral layer 1 and converts the absorbed light into light having a wavelength longer than that of the absorbed light. The refractive index of the transparent resin of which the core 2 is made is preferably 1.5 or higher.

The cladding layer 3 covers the outer peripheral surface of the core 2 and is made of a transparent resin having a refractive index lower than that of the core 2. Note that the wavelength shifting fiber composed of the core 2 and the cladding layer 3, and the outermost peripheral layer 1 covering the outer peripheral surface of the wavelength shifting fiber are integrally formed.

In order to make the wavelength shifting fiber function as an optical fiber and transmit light over a long distance, the transparency of the cladding layer 3 is as important as the transparency of the core 2. For the long-distance transmission, the transparency of the outermost peripheral layer 1 is not so important.

In order to make the wavelength shifting fiber function as an optical fiber and transmit light over a long distance, the thickness of the cladding layer 3 is preferably from 3 μm to 100 μm, which is sufficiently thicker than the depth of evanescent waves that seeps out from the core into the cladding layer 3. The thickness of the cladding layer 3 can be sufficiently thicker than the depth of the evanescent waves seeping into the cladding layer 3.

As for the wavelength-shifting fluorescent substance contained in the core 2, it is desirable that the absorption spectrum match the wavelength of the scintillation light generated in the outermost peripheral layer 1, and that the fluorescence spectrum, to which the absorption spectrum is shifted, be as far away from the absorption spectrum as possible. Further, the core 2 may also contain a second fluorescent substance for additional wavelength shifting in order to, for example, conform the shifted wavelength to the wavelength at which the photoelectric detector, such as a photomultiplier tube (PMT) or avalanche photodiode (APD), has good sensitivity. Note that details of the fluorescent substance will be described later.

In the plastic scintillating fiber according to the first embodiment, the outermost peripheral layer 1 contains a compound of a heavy metal element having a high interaction probability with X-rays and γ-rays. Therefore, with the irradiation of X-rays and γ-rays, in the outermost peripheral layer 1, more charged particles such as electrons and positrons are generated due to the photoelectric effect, the Compton effect, and electron pair generation, as compared with conventional fibers composed only of light elements such as carbon, hydrogen, and oxygen. As a result, scintillation light is generated in the outermost peripheral layer 1 made of the resin having scintillating properties. Further, the core 2 disposed inside the outermost peripheral layer absorbs the scintillation light, wavelength-converts the absorbed light, and transmits the wavelength-converted light. Therefore, X-rays and γ-rays can be detected with higher sensitivity than conventional plastic scintillating fibers.

That is, the plastic scintillating fiber according to the first embodiment is a scintillator integrated plastic wavelength shifting fiber in which a scintillator (the outermost peripheral layer 1) and the plastic wavelength shifting fiber (the core 2 and cladding layer 3) are integrated. Therefore, there is no need for the post-processing, which is required to combine a scintillator and a wavelength shifting fiber in the conventional technology. Further, the productivity is significantly improved and the costs are reduced as compared to the conventional technology.

Note that, outside the outermost peripheral layer 1, a protective layer that protects the outermost peripheral layer (not shown) may be integrally formed. The protective layer improves the durability and the like of the plastic scintillating fiber.

The material of the protective layer is not particularly limited, and it is preferably a thermoplastic resin that can be integrally formed with the outermost peripheral layer 1 from the viewpoint of productivity.

Modified Example of Plastic Scintillating Fiber

Figure 2:
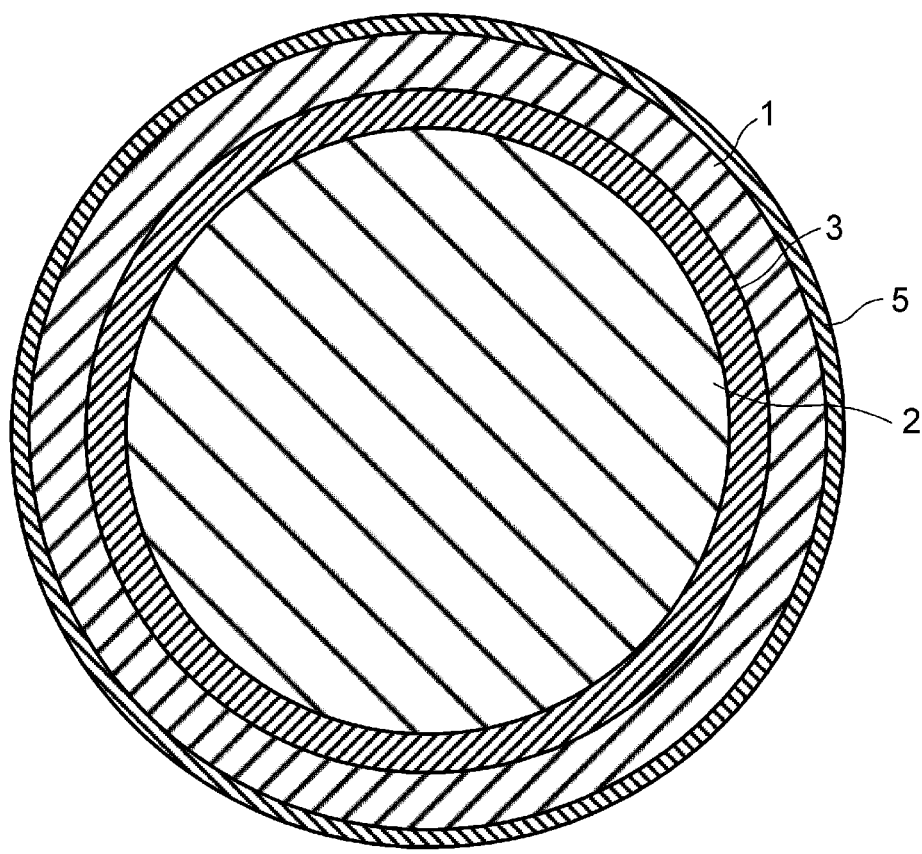
FIG. 2 is a cross-sectional diagram of a plastic scintillating fiber according to a modified example of the first embodiment.

FIG. 2 is a cross-sectional diagram of a plastic scintillating fiber according to a modified example of the first embodiment. As shown in FIG. 2, a reflective layer 5 may be provided on the surface of the outermost peripheral layer 1 or the protective layer. The scintillation light emitted in the outermost peripheral layer 1 and the light whose wavelength has been shifted in the core 2 are reflected in the reflective layer 5 to be unlikely to leak outside from the side surface of the fiber, resulting in intense light. Note that, by setting the reflective layer 5 to a metal film, a high reflectance can be obtained with a small thickness. Meanwhile, a metal film has a high interaction probability with X-rays and γ-rays. Therefore, by increasing the thickness thereof, the sensitivity to X-rays and γ-rays is improved, and the utilization efficiencies of light that is wavelength-converted in the core 2 and scintillation light that is emitted in the outermost peripheral layer 1 are increased, allowing to generate intense light.

Figure 3:
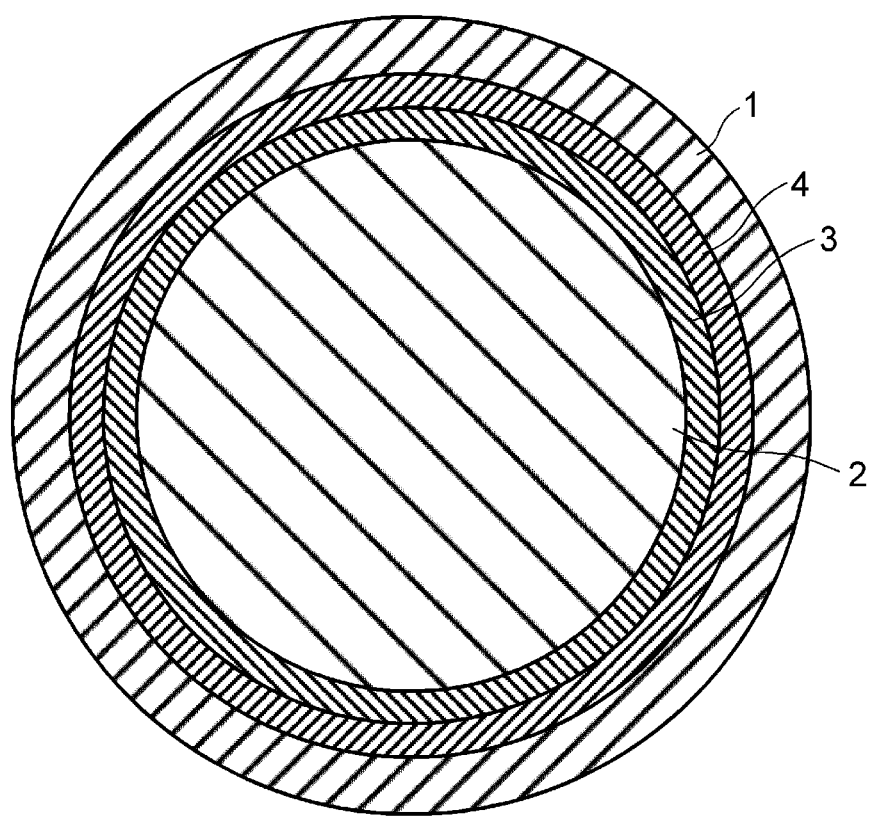
FIG. 3 is a cross-sectional diagram of a plastic scintillating fiber according to another modified example of the first embodiment.

FIG. 3 is a cross-sectional diagram of a plastic scintillating fiber according to another modified example of the first embodiment. In the plastic scintillating fiber according to another modified example, the cladding layer 3 is provided as an inner cladding layer, and an additional cladding layer 4 is provided as an outer cladding layer. That is, the cladding layer has a multi-cladding structure including an inner cladding layer (the cladding layer 3) and an outer cladding layer (the cladding layer 4). The cladding layer 4 covers the outer peripheral surface of the cladding layer 3 and is made of a transparent resin having a refractive index lower than that of the cladding layer 3.

Note that re-emitted light, which has been wavelength-converted in the core 2, is isotropically radiated in a solid angle manner in the core 2. Therefore, only the light that is within the total reflection angle, which is determined based on the difference between the refractive index of the core 2 and that of the cladding layer 3 or 4 can be transmitted in the direction of the fiber. Since the plastic scintillating fiber according to another modified example includes the cladding layer 4 having a low refractive index in addition to the cladding layer 3, its total reflection angle becomes wider (the aperture NA becomes larger) than that of the plastic scintillating fiber shown in FIG. 1, so that more intense light is obtained.

<Material for Outermost Peripheral Layer 1>

The outermost peripheral layer 1, which is a scintillator layer, is made of a transparent resin containing a compound of a heavy metal element having scintillating properties.

The transparent resin of which the outermost peripheral layer 1 is made having scintillating properties is preferably thermoplastic so that it can be drawn into a thin thread by heating. As such a transparent resin, a homopolymer or copolymer composed of aromatic monomers having a vinyl group-containing typified by styrene is suitable.

Note that, the outermost peripheral layer 1 may contain a transparent resin not having scintillating properties. Examples of such transparent resins include homo-polymers and copolymers composed of any of methacrylic acid ester monomers typified by methyl methacrylate or the like and acrylic ester monomers typified by methyl acrylate.

It is desirable that the compound of a heavy metal element is stable and highly soluble in aromatic monomers having a vinyl group having scintillating properties, such as styrene. If the solubility is high, a polymer obtained by dissolving the compound of a heavy metal element in an aromatic monomer and polymerizing it has high transparency. If the solubility is low, the compound of a heavy metal element is not uniformly dispersed in the plastic scintillation material, causing problems such as variations in detection sensitivity to X-rays and γ-rays. Further, when it is dispersed as powder, drawing by heating becomes difficult.

Alternatively, the compound of a heavy metal element may be a monomer that can be copolymerized with the monomer that is the raw material of the transparent resin.

As a lead compound, in addition to various lead carboxylates such as lead (II) methacrylate, lead (IV) acetate, lead (II) citrate, lead naphthenate, lead (II) octylate, lead (II) stearate, lead (II) formate, lead (II) tartrate, lead cyclohexanoate (II), and lead 2-ethylhexylate (II), various lead compounds such as lead (II) acetylacetonate, lead (II) hexafluoroacetylacetonate, bis(2,2,6,6-tetramethyl-3,5-heptanedionato) lead, tetraphenyl lead, diphenyl lead dichloride, tetraphenyl (phenylethynyl) lead (IV), lead metavanadate (II), lead titanate (II), lead zirconate (II), lead arsenate (II), and lead hexafluorosilicate are preferably used.

As a bismuth compound, bismuth carboxylates such as bismuth (III) subgallate, bismuth (III) subsalicylate, bismuth (III) methacrylate, bismuth (III) acrylate, bismuth (III) neo-decanoate, bismuth (III) oxyacetate, bismuth (III) benzoate, bismuth citrate (III), and tris(2-ethylhexanoate) bismuth (III); bismuthine compounds such as triphenylbismuthine, tri-para-tolylbismuthine, and tris(2-methoxyphenyl)bismuthine; alkoxide compounds of bismuth such as tri-i-propoxybismuth, triethoxybismuth, and tri-t-amyloxybismuth; and bismuth chelate complexes such as tris (dipivaloylmethanato)bismuth are preferably used. Note that, the carboxylic acid of the carboxylate and the alcohol of the alkoxide may be each used singly, but may be each used in combination.

The wavelength shifting fluorescent substance contained in the outermost peripheral layer 1 is preferably an organic fluorescent substance having an aromatic ring and having a structure capable of resonating, and is preferably monomolecularly dissolved in the core 2. Typical examples of the fluorescent substance include 2-(4-t-butylphenyl)-5-(4-biphenyl)-1,3,4-oxadiazole (b-PBD), 2-(4-biphenyl)-(PBD), para-terphenyl (PTP), para-quarterphenyl (PQP), 2,5-diphenyloxazole (PPO), 1-phenyl-3-(2,4,6-trimethylphenyl)-2-pyrazoline (PMP), and 3-hydroxyflavone (3HF) all of which absorb light having a wavelength of 250 to 350 nm.

Further, examples also include 4,4'-bis-(2,5-dimethylstyryl)-diphenyl (BDB), 2,5-bis-(5-t-butyl-benzoxazoyl)-thiophene (BBOT), 1,4-bis-(2-(5-phenyloxazolyl))benzene (POPOP), 1,4-bis-(4-methyl-5-phenyl-2-oxazolyl)benzene (DMPOPOP), 1,4-diphenyl-1,3-butadiene (DPB), and 1,6-diphenyl-1,3,5-hexatriene (DPH) all of which absorb light having a wavelength of 350 to 400 nm.

Examples of the outermost peripheral layer 1 include a layer containing polystyrene copolymerized with lead methacrylate and also containing a fluorescent substance that converts the scintillation light of polystyrene into light having a longer wavelength. The inclusion of lead or bismuth, which is a heavy metal element, increases the probability of generating charged particles such as positrons and electrons due to the photoelectric effect, Compton effect, and electron pair generation when it is irradiated with X-rays and γ-rays. The charged particles generated here cause the outermost peripheral layer 1 itself to emit light by scintillation light emitted from polystyrene contained in the outermost peripheral layer 1.

Another example of the outermost peripheral layer 1 includes a layer containing, in polystyrene, triphenylbismuth and a fluorescent substance that converts the scintillation light of polystyrene into light having a longer wavelength. The inclusion of bismuth, which is a heavy metal element, increases the probability of generating charged particles such as positrons and electrons due to the photoelectric effect, Compton effect, and electron pair generation when it is irradiated with X-rays and γ-rays. The charged particles generated here cause the outermost peripheral layer 1 itself to emit light by scintillation light emitted from polystyrene contained in the outermost peripheral layer 1.

Note that, the types of the compound of a heavy metal element, the resin having scintillating properties, and the wavelength shifting fluorescent substance are not limited to the above. Further, the blending ratio and the concentration of the above materials are selected as appropriate according to the degree of difficulty of the manufacturing and the like, and are not limited to the above.

<Material for Core 2>

There are no restrictions on the material used for the core 2 as long as the material is a transparent resin. Among them, a homopolymer or a copolymer composed of any of methacrylic acid ester monomers typified by methyl methacrylate, acrylic ester monomers typified by methyl acrylate, and aromatic monomers having vinyl groups typified by styrene is preferred.

Among them, a copolymer composed of an aromatic monomer having a vinyl group is preferred because it has a high refractive index. The difference between the refractive index of the core 2 and that of the cladding layer 3 increases, so that the total reflection angle becomes wider. That is, of the whole light whose wavelength has been shifted inside the core 2, the light emitted in a wider angle can be transmitted, thus making it possible to obtain a scintillating fiber capable of outputting more intense light.

The wavelength shifting fluorescent substance contained in the core 2 is preferably an organic fluorescent substance having an aromatic ring and having a structure capable of resonating, and is preferably monomolecularly dissolved in the core 2. Typical examples of the fluorescent substance include 2-(4-t-butylphenyl)-5-(4-biphenyl)-1,3,4-oxadiazole (b-PBD), 2-(4-biphenyl)-5-phenyl-1,3,4-oxadiazole (PBD), para-terphenyl (PTP), para-quarterphenyl (PQP), 2,5-diphenyloxazole (PPO), 1-phenyl-3-(2,4,6-trimethylphenyl)-2-pyrazoline (PMP), and 3-hydroxyflavone (3HF) all of which absorb light having a wavelength of 250 to 350 nm.

Further, preferable examples also include 4,4'-bis-(2,5-dimethylstyryl)-diphenyl (BDB), 2,5-bis-(5-t-butyl-benzoxazoyl)-thiophene (BBOT), 1,4-bis-(2-(5-phenyloxazolyl))benzene (POPOP), 1,4-bis-(4-methyl-5-phenyl-2-oxazolyl) benzene (DMPOPOP), 1,4-diphenyl-1,3-butadiene (DPB), and 1,6-diphenyl-1,3,5-hexatriene (DPH) all of which absorb light having a wavelength of 350 to 400 nm.

To obtain intense light, it is preferred that the overlap between the absorption spectrum of the wavelength-shifting fluorescent substance contained in the core 2 and the emission spectrum of the fluorescent substance contained in the outermost peripheral layer 1 be large.

Only one of the aforementioned wavelength-shifting fluorescent substances may be used, or a plurality of wavelength-shifting fluorescent substances may be used in combination. For each wavelength-shifting fluorescent substance, it is preferred that a quantum yield be high and the overlap between the absorption and emission spectra be small (the Stokes shift be large). As a characteristic of plastic fibers, the longer the wavelength is, the smaller the transmission loss of visible light becomes. Therefore, a wavelength-shifting fluorescent substance that emits light having a longer wavelength is preferred, and two or more types of wavelength-shifting fluorescent substances may be used as appropriate in combination. The wavelength-shifting fluorescent substance is preferably soluble in the transparent resin of which the core 2 is made.

The concentration of the wavelength-shifting fluorescent substance is preferably 50 to 10,000 ppm as expressed in mass concentration, and more preferably 100 to 1,000 ppm, irrespective of whether only one wavelength-shifting fluorescent substance is used or a plurality of wavelength-shifting fluorescent substances are used. If the concentration is too low, the scintillation light emitted from the outermost peripheral layer 1 cannot be efficiently absorbed in the core 2. On the other hand, if the concentration is too high, the effect of the self-absorption of the fluorescent substance itself will increase. Therefore, the efficiency of the wavelength shifting decreases and/or the transmittance for the converted light decreases, so that the attenuation length deteriorates.

<Material for Cladding Layer 3>

There are no restrictions on the material used for the cladding layer 3 as long as the material is a transparent resin having a refractive index lower than that of the core 2. Among them, a homopolymer or a copolymer composed of any of methacrylate ester monomers typified by methyl methacrylate and fluorinated monomers such as perfluoroalkyl methacrylate, or any of acrylate ester monomers typified by methyl acrylate and fluorinated monomers such as perfluoroalkyl acrylate is suitable.

<Material for Cladding Layer 4>

Any transparent resin having a refractive index even lower than that of the cladding layer 3 may be used as the material for the cladding layer 4. The material for the cladding layer 4 can be selected from the monomers for the cladding layer 3 and the like. In particular, it is preferred to select the material from fluorine-containing monomers having a low refractive index.

Regarding these monomers, a polymer or a copolymer can be easily obtained by heat or light irradiation. Therefore, they are advantageous because it is possible to easily adjust a refractive index by compositions, and they can be easily handled. In the polymerization, an organic peroxide or an azo compound may be added as a polymerization initiator. Typical examples of the organic peroxide include 1,1,3,3-tetramethylbutylperoxy-2-ethyl hexanoate, n-butyl-4,4-bis (t-butylperoxy)valerate, and 1,1-bis(t-butylperoxy)cyclohexane. However, there are no particular restrictions on the organic peroxide as long as it generates a radical by heat or light irradiation.

Further, mercaptan may be added as a chain transfer agent for adjusting the molecular weight. Typical examples of the mercaptan include octyl mercaptan, but there are no particular restrictions as long as it has a structure expressed as R—SH (where R represents an organic group).

<Material of Reflective Layer>

There are no restrictions on the material constituting the reflective layer 5 as long as it can reflect the light emitted from the side surface of the fiber with high reflectance. Among them, a metal film is preferred, because a high reflectance can be obtained with a smaller thickness than, for example, a white reflective paint or the like, and the sensitivity to X-rays and γ-rays is further improved.

The metal film is not particularly limited, such as aluminum, gold, silver, and nickel, as long as the reflectance in the required wavelength range is high. Aluminum and silver are suitable because of their high reflectance in the visible light region. Further, from the viewpoint of cost, aluminum is suitable.

Note that, the thickness of the metal film is not particularly limited, and it is preferable to obtain a high reflectance with the thickness as thin as possible in the visible light region. For example, aluminum preferably has a thickness of 10 to 100 nm, more preferably to 70 nm. Silver preferably has a thickness of 35 to 150 nm, more preferably 50 to 100 nm. Meanwhile, when the diameter of the fiber is not limited, the metal film may be made as thick as possible. By increasing the thickness of the metal film, the sensitivity to X-rays and γ-rays is further improved.

Further, the film formation method is not particularly limited, such as a vapor deposition method and a sputtering method.

<Method for Manufacturing Plastic Scintillating Fiber>

Figure 4:
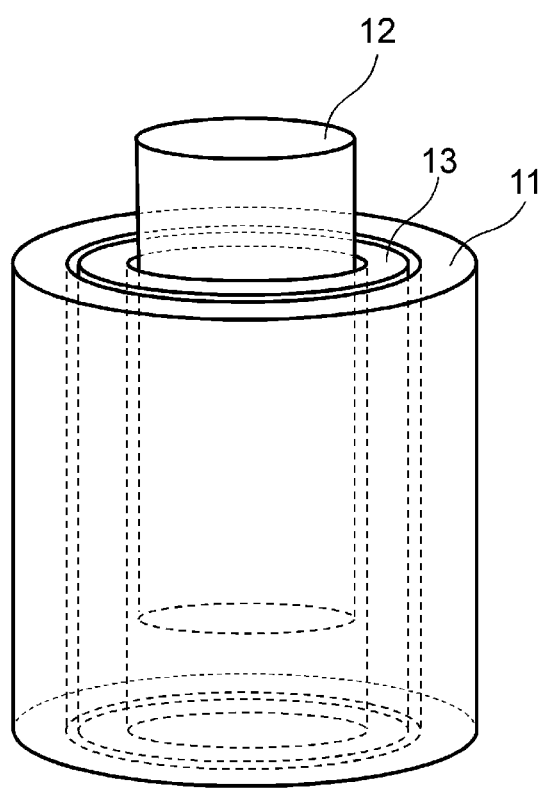
FIG. 4 is a perspective view showing a method for manufacturing a plastic scintillating fiber according to the first embodiment.

FIG. 4 is a perspective view showing a method for manufacturing a plastic scintillating fiber according to the first embodiment. FIG. 4 shows a base material (a preform) for manufacturing the plastic scintillating fiber shown in FIG. 1.

A first cylindrical body 11 is a cylindrical body made of a thermoplastic resin containing a compound of a heavy metal element having scintillating properties. The thermoplastic resin contains fluorescent substance that absorbs the scintillation light generated from the resin and converts the absorbed light into light having a wavelength longer than that of the absorbed light. The first cylindrical body 11 will constitute the outermost peripheral layer 1 after a drawing process.

A rod 12 is a cylindrical body made of a transparent thermoplastic resin in which at least one type of fluorescent substance that absorbs scintillation light and converts the absorbed light into light having a wavelength longer than that of the absorbed light is dissolved. The rod 12 will constitute the core 2 after the drawing process.

A second cylindrical body 13 is a cylindrical body made of a transparent thermoplastic resin having a refractive index lower than that of the rod 12. The second cylindrical body 13 will constitute the cladding layer 3 after the drawing process.

As shown in FIG. 4, a preform is manufactured by inserting the second cylindrical body 13 into the first cylindrical body 11 and inserting the rod 12 into the second cylindrical body 13. FIG. 4 shows a state in which the rod 12 is in the process of being inserted into the second cylindrical body 13. A plastic scintillating fiber according to the first embodiment is obtained by, while heating the tip of the manufactured preform, drawing the preform into, for example, a thread having an outer diameter of 1 mm.

Note that although a gap is formed between the first cylindrical body 11 and the second cylindrical body 13, and between the second cylindrical body 13 and the rod 12 as shown in FIG. 4, the core 2, the cladding layer 3, and the outermost peripheral layer 1 are integrally formed while being tightly in contact with each other because the drawing process is performed under a reduced-pressure.

The plastic scintillating fiber according to the modified example shown in FIG. 3 can also be manufactured by a similar manufacturing method.

In the method for manufacturing a plastic scintillating fiber according to the first embodiment, a scintillator layer (the outermost peripheral layer 1) containing a compound of a heavy metal element is integrally formed on the outer peripheral surface of the wavelength shifting fiber (the core 2 and cladding layer 3). Therefore, the plastic scintillating fiber is capable of detecting X-rays and γ-rays as well as capable of transmitting light. That is, the plastic scintillating fiber is a scintillator integrated plastic wavelength shifting fiber that has, by itself, both the function as a conventional scintillator and the function as a wavelength shifting fiber.

Therefore, there is no need for the post-processing, which is required to combine the scintillator and the wavelength shifting fiber in the conventional technology. Therefore, the productivity is significantly improved and the costs is reduced as compared to the conventional technology. In particular, in the case of image detection, there is no need to separate and combine scintillators one by one for each of wavelength shifting fibers. That is, all that has to be done is to arrange (e.g., line up) plastic scintillating fibers. Therefore, the productivity is significantly improved and the costs are reduced as compared to the conventional technology.

Note that after manufacturing the wavelength shifting fiber (the core 2 and the cladding layer 3), the scintillator layer (the outermost peripheral layer 1) may be integrally formed by a coating process (including a painting process) on the surface of the wavelength shifting fiber.

Application Example of Plastic Scintillating Fiber

Figure 5:
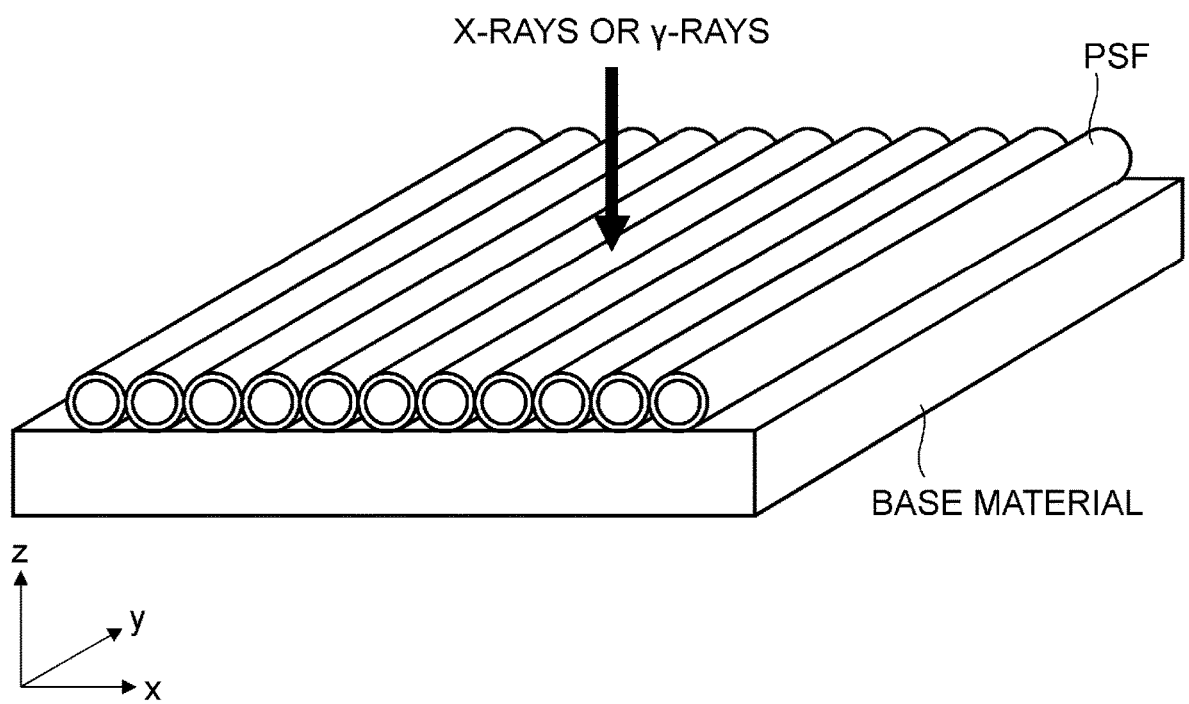
FIG. 5 is a perspective view showing an example in which scintillating fibers according to the first embodiment are applied.

Next, an example in which the plastic scintillating fiber according to the first embodiment is applied will be described with reference to FIG. 5. FIG. 5 is a perspective view showing an example in which plastic scintillating fibers according to the first embodiment are applied. In this application example, the plastic scintillating fibers PSFs according to the first embodiment is arranged in an array on a substrate.

Note that, needless to say, a right-handed xyz-orthogonal coordinate system shown in FIG. 5 is shown just for the sake of convenience for explaining the positional relation among components. In general, the z-axis positive direction is vertically upward and the xy-plane is parallel to the horizontal plane.

Each of the plastic scintillating fibers (PSFs) is connected to a photoelectric detector such as a photomultiplier tube (not shown), so it can detect transmitted light. By the above-described configuration, it is possible to perform, for example, one-dimensional image detection (position detection) with a resolution of 1 mm. Note that the resolution is equal to the diameter of each of the plastic scintillating fibers PSFs. Further, by preparing two arrays of such plastic scintillating fibers (PSFs) and stacking them on top of each other in such a manner that they are perpendicular to each other, it is also possible to perform two-dimensional image detection.

In this way, it is also possible to, by using plastic scintillating fibers according to this embodiment, easily perform image detection of X-rays and γ-rays with a high spatial resolution at low costs.

EXAMPLES

The present invention will be described hereinafter in a more detailed manner by using examples, but is not limited by those examples at all.

Example 1

20 mass % of lead methacrylate and 1 mass % of fluorescent substance 2-(4-t-butylphenyl)-5-(4-biphenyl)-1, 3,4-oxadiazole (b-PBD) were added to a styrene monomer, the mixture was copolymerized, and the resulting polymer was formed into a cylindrical body for an outermost peripheral layer (first cylindrical body 11 in FIG. 4) having an outer diameter of 95 mm and an inner diameter of 71 mm.

A rod for a core having a diameter of 65 mm, made of polystyrene (having a refractive index 1.59) (i.e., the rod 12 in FIG. 4) and a cylindrical body for a cladding layer having an outer diameter of 70 mm and an inner diameter of 66 mm, made of polymethyl methacrylate (having a refractive index of 1.49) (i.e., the second cylindrical body 13 in FIG. 4) were prepared. In the rod for the core, 2,5-bis-(5-t-butyl-benzoxazoyl)thiophene (BBOT) was dissolved as a wavelength-shifting fluorescent substance at a concentration of 200 mass ppm.

As shown in FIG. 4, a preform was manufactured by inserting the cylindrical body for the cladding layer into the cylindrical body for the outermost peripheral layer and inserting the rod for the core into the cylindrical body for the cladding layer. A plastic scintillating fiber according to the Example 1 was obtained by integrally drawing, while heating the tip of the preform, the preform under a reduced pressure so that the outer diameter of the drawn thread became 1 mm. This plastic scintillating fiber had the cross-sectional structure shown in FIG. 1. The outer diameter was 1 mm, and the diameter of the cladding layer 3 was 0.72 mm. The diameter of the core 2 was 0.68 mm, and the thickness of the outermost peripheral layer 1 was 0.14 mm. Further, the thickness of the cladding layer 3 was 0.02 mm.

Figure 6:
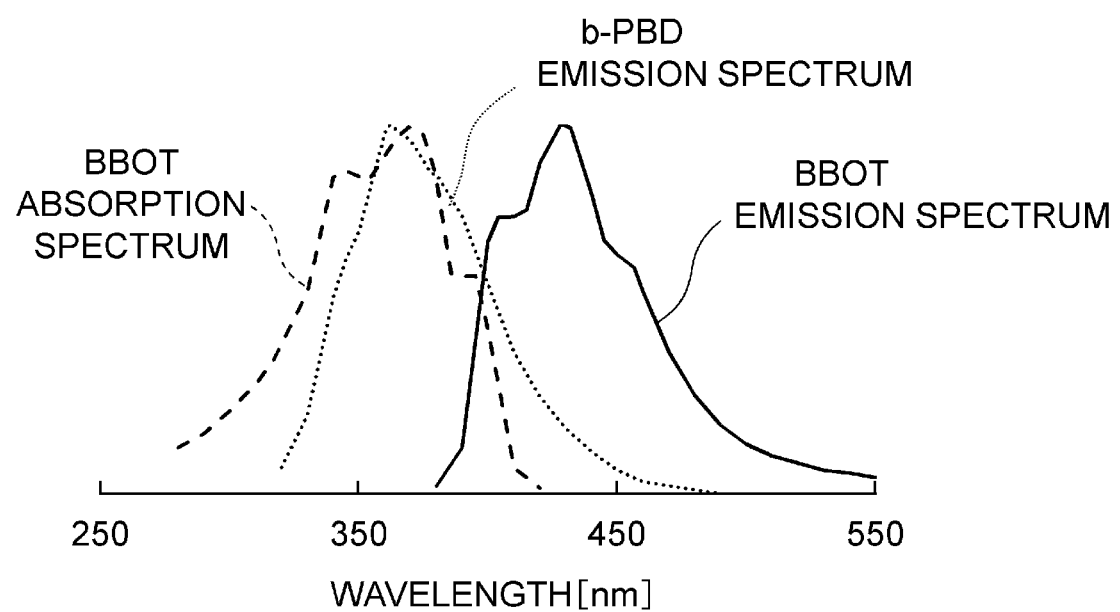
FIG. 6 shows the emission spectrum of para-terphenyl added to the outermost peripheral layer and the absorption and emission spectra of the wavelength-shifting fluorescent substance BBOT.

FIG. 6 is a graph showing the emission spectrum of fluorescent substance 2-(4-t-butylphenyl)-5-(4-biphenyl)-1, 3,4-oxadiazole (b-PBD) added to the outermost peripheral layer 1 and the absorption and emission spectra of the wavelength-shifting fluorescent substance BBOT. As shown in FIG. 6, there is a large overlap between the emission spectrum of the outermost peripheral layer 1 and the absorption spectrum of the wavelength-shifting fluorescent substance.

In the plastic scintillating fiber according to Example 1, the outermost peripheral layer 1 contains lead element having a higher interaction probability with X-rays and γ-rays than light elements such as carbon, hydrogen, and oxygen. Therefore, the detection sensitivity to X-rays and γ-rays was improved as compared with the conventional plastic scintillating fiber.

Example 2

Similarly to the Example 1, a cylindrical body for an outermost peripheral layer having an outer diameter of 95 mm and an inner diameter of 76 mm (i.e., the first cylindrical body 11 in FIG. 4) was formed. Further, similarly to the Example 1, a rod for a core having a diameter of 65 mm, made of polystyrene (having a refractive index 1.59) (i.e., the rod 12 in FIG. 4) and a cylindrical body for an inner cladding layer having an outer diameter of 70 mm and an inner diameter of 66 mm, made of polymethyl methacrylate (having a refractive index of 1.49) (i.e., the second cylindrical body 13 in FIG. 4) were prepared. In the rod for the core, BBOT was dissolved as a wavelength-shifting fluorescent substance at a concentration of 300 mass ppm.

Further, in the Example 2, a cylindrical body for an outer cladding layer having an outer diameter of 75 mm and an inner diameter of 71 mm, made of a copolymer of a fluorinated monomer such as perfluoroalkyl acrylate (having a refractive index 1.42) (not shown) was prepared. The cylindrical body for the outer cladding layer will constitute the cladding layer 4 shown in FIG. 3 after the drawing process.

Then, a preform was manufactured by inserting the cylindrical body for the outer cladding layer into the cylindrical body for the outermost peripheral layer, inserting the cylindrical body for the inner cladding layer into the cylindrical body for the outer cladding layer, and inserting the rod for the core into the cylindrical body for the inner cladding layer.

A plastic scintillating fiber according to the Example 2 was obtained by integrally drawing, while heating the tip of the preform, the preform under a reduced pressure so that the outer diameter of the drawn thread became 1 mm. This plastic scintillating fiber had the cross-sectional structure shown in FIG. 3. The outer diameter was 1 mm, and the outer diameter of the cladding layer 4 was 0.76 mm. The outer diameter of the cladding layer 3 was 0.72 mm, and the diameter of the core 2 was 0.68 mm. The thickness of the outermost peripheral layer 1 was 0.12 mm, and the thickness of the cladding layer 4 was mm. Further, the thickness of the cladding layer 3 was 0.02 mm.

When X-ray was applied to the plastic scintillating fiber according to the Example 2, quantity of light 30% higher than that in the Example 1 could be observed at the tip of the fiber 10 m away from the application point of the radiation. It is considered that although the diameter of the core 2 became smaller than that in the Example 1, the total reflection angle became wider by the provision of the cladding layer 4 having a lower refractive index, so that more intense light was obtained.

Example 3

10 mass % of triphenyl bismuth and 1 mass % of fluorescent substance 2-(4-t-butylphenyl)-5-(4-biphenyl)-1,3,4-oxadiazole (b-PBD) were added to a styrene monomer, the mixture was polymerized, and the resulting polymer was formed into a cylindrical body for an outermost peripheral layer (first cylindrical body 11 in FIG. 4) having an outer diameter of 95 mm and an inner diameter of 71 mm.

A rod for a core having a diameter of 65 mm, made of polystyrene (having a refractive index 1.59) (i.e., the rod 12 in FIG. 4) and a cylindrical body for a cladding layer having an outer diameter of mm and an inner diameter of 66 mm, made of polymethyl methacrylate (having a refractive index of 1.49) (i.e., the second cylindrical body 13 in FIG. 4) were prepared. In the rod for the core, 2,5-bis-(5-t-butyl-benzoxazoyl)thiophene (BBOT) was dissolved as a wavelength-shifting fluorescent substance at a concentration of 200 mass ppm.

As shown in FIG. 4, a preform was manufactured by inserting the cylindrical body for the cladding layer into the cylindrical body for the outermost peripheral layer and inserting the rod for the core into the cylindrical body for the cladding layer. A plastic scintillating fiber according to the Example 3 was obtained by integrally drawing, while heating the tip of the preform, the preform under a reduced pressure so that the outer diameter of the drawn thread became 1 mm. This plastic scintillating fiber had the cross-sectional structure shown in FIG. 1. The outer diameter was 1 mm, and the diameter of the cladding layer 3 was 0.72 mm. The diameter of the core 2 was 0.68 mm, and the thickness of the outermost peripheral layer 1 was 0.14 mm. Further, the thickness of the cladding layer 3 was 0.02 mm.

In the plastic scintillating fiber according to Example 3, the outermost peripheral layer 1 contains bismuth element having a higher interaction probability with X-rays and γ-rays than light elements such as carbon, hydrogen, and oxygen. Therefore, the detection sensitivity to X-rays and γ-rays was improved as compared with the conventional plastic scintillating fiber.

Example 4

An aluminum film having a thickness of about 50 nm was formed on the surface of the plastic scintillating fiber according to Example 1 by a vapor deposition method.

The scintillation light emitted in the outermost peripheral layer 1 and the light whose wavelength had been shifted in the core 2 were reflected in the reflective layer 5 to be unlikely to leak outside from the side surface of the fiber, resulting in intense light.

The present invention is not limited to the above-described embodiments, and they may be modified as desired without departing from the scope and spirit of the present invention.

This application is based upon and claims the benefit of priority from Japanese patent application No. 2020-173826, filed on Oct. 15, 2020, the entire disclosure of which is incorporated herein in its entirety by reference.

REFERENCE SIGNS LIST

1 OUTERMOST PERIPHERAL LAYER
2 CORE
3 CLADDING LAYER (INNER CLADDING LAYER)
4 CLADDING LAYER (OUTER CLADDING LAYER)
5 REFLECTIVE LAYER
11 FIRST CYLINDRICAL BODY
12 ROD
13 SECOND CYLINDRICAL BODY
PSF PLASTIC SCINTILLATING FIBER

The invention claimed is:

1. A plastic scintillating fiber, comprising:
an outer peripheral layer containing a resin having scintillating properties, the resin containing:
a compound of a heavy metal element; and
at least one type of a first fluorescent substance that absorbs a first scintillation light emitted from the resin and wavelength-converts the first absorbed light into a first light having a wavelength longer than that of the first scintillation light;
a core disposed inside the outer peripheral layer and containing at least one type of a second fluorescent substance that absorbs the first light emitted from the first fluorescent substance and wavelength-converts this second absorbed light into a second light having a wavelength longer than that of the second absorbed light; and
a cladding layer covering an outer peripheral surface of the core and having a refractive index lower than that of the core,
wherein a wavelength shifting fiber including the core and the cladding layer, and the outer peripheral layer covering an outer peripheral surface of the wavelength shifting fiber are integrally formed,
the first scintillation light is ultraviolet light having a wavelength of 250 to 350 nm, and
the second light emitted from the second fluorescent substance has a wavelength of 350 to 600 nm.

2. The plastic scintillating fiber according to claim 1, wherein the heavy metal element is lead.

3. The plastic scintillating fiber according to claim 1, wherein the heavy metal element is bismuth.

4. The plastic scintillating fiber according to claim 1, wherein in the outer peripheral layer, the compound of a heavy metal element is copolymerized with the resin having scintillating properties.

5. The plastic scintillating fiber according to claim 1, wherein the wavelength shifting fiber and the outer peripheral layer are integrally formed by a drawing process.

6. The plastic scintillating fiber according to claim 1, wherein outside the outer peripheral layer, a protective layer that protects the outer peripheral layer is integrally formed.

7. The plastic scintillating fiber according to claim 1, wherein the cladding layer has a multi-cladding structure comprising:
an inner cladding layer; and an outer cladding layer covering an outer peripheral surface of the inner cladding layer and having a refractive index lower than that of the inner cladding layer.

8. The plastic scintillating fiber according to claim 1, comprising a reflective layer outside the outer peripheral layer.

9. The plastic scintillating fiber according to claim 8, wherein the reflective layer is a metal film.

10. A method for manufacturing a plastic scintillating fiber, the fiber comprising:
- an outer peripheral layer containing a resin having scintillating properties, the resin containing:
- a compound of a heavy metal element; and
- at least one type of a first fluorescent substance that absorbs a first scintillation light emitted from the resin and wavelength-converts the first absorbed light into a first light having a wavelength longer than that of the first scintillation light;
- a core disposed inside the outer peripheral layer and containing at least one type of a second fluorescent substance that absorbs the first light emitted from the first fluorescent substance and wavelength-converts this second absorbed light into a second light having a wavelength longer than that of the second absorbed light; and
- a cladding layer covering an outer peripheral surface of the core and having a refractive index lower than that of the core, and the method comprising:
- a process of manufacturing a preform by inserting a second cylindrical body for the cladding layer into a first cylindrical body for the outer peripheral layer, and inserting a rod for the core into the second cylindrical body; and
- a process of drawing the preform while heating the preform, wherein
the first scintillation light is ultraviolet light having a wavelength of 250 to 350 nm, and
the second light emitted from the second fluorescent substance has a wavelength of 350 to 600 nm.

11. A method for manufacturing a plastic scintillating fiber, the fiber comprising:
- an outer peripheral layer containing a resin having scintillating properties, the resin containing:
- a compound of a heavy metal element; and
- at least one type of a first fluorescent substance that absorbs a first scintillation light emitted from the resin and wavelength-converts the first absorbed light into a first light having a wavelength longer than that of the first scintillation light;
- a core disposed inside the outer peripheral layer and containing at least one type of a second fluorescent substance that absorbs the first light emitted from the first fluorescent substance and wavelength-converts this second absorbed light into a second light having a wavelength longer than that of the second absorbed light; and
- a cladding layer covering an outer peripheral surface of the core and having a refractive index lower than that of the core, and the method comprising:
- coating the outer peripheral layer on a surface of a wavelength shifting fiber containing the core and the cladding layer, wherein
the first scintillation light is ultraviolet light having a wavelength of 250 to 350 nm, and the second light emitted from the second fluorescent substance has a wavelength of 350 to 600 nm.

* * * * *